Inventor:
William Scarince
By Dudley B. Howard
Attorney

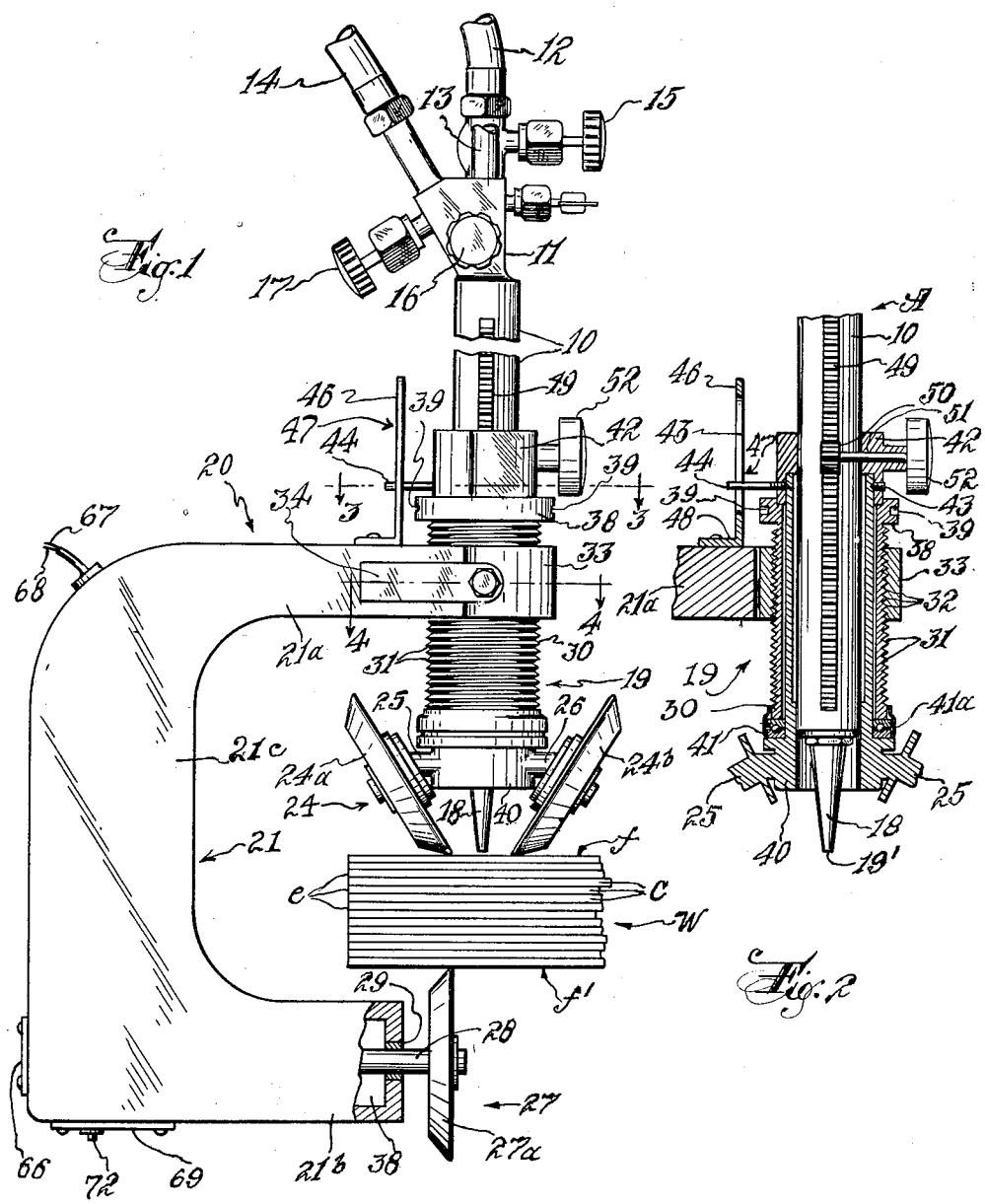

Jan. 1, 1963
W. SCARINCE
3,071,360
STACK-CUTTING MACHINE WITH CUTTER-FOLLOWING
STACK CLAMPING MEANS
Filed May 29, 1958
3 Sheets-Sheet 3
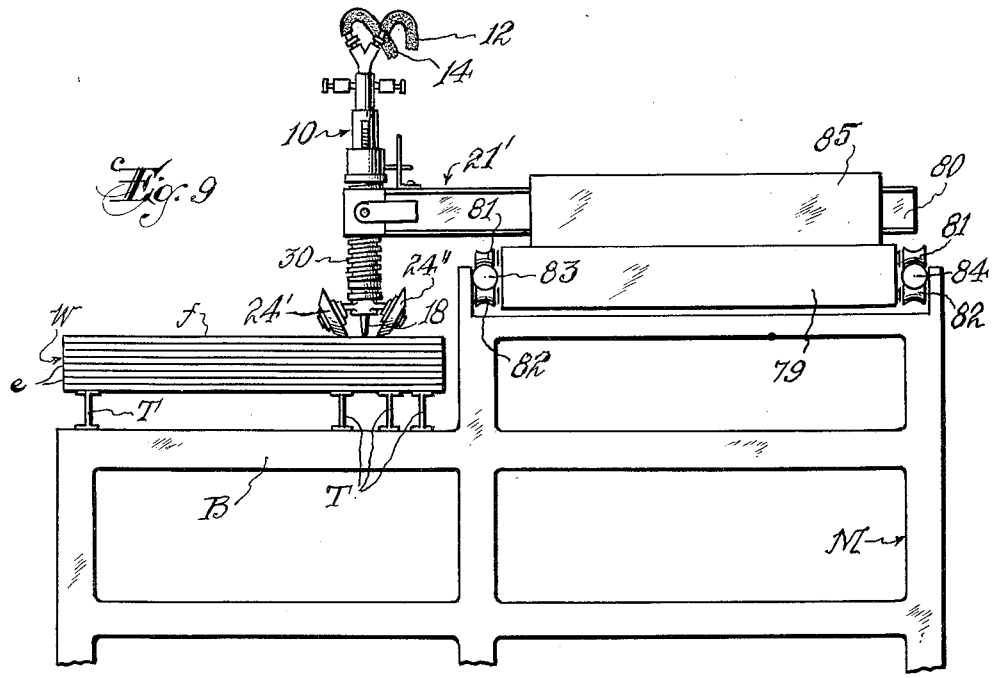
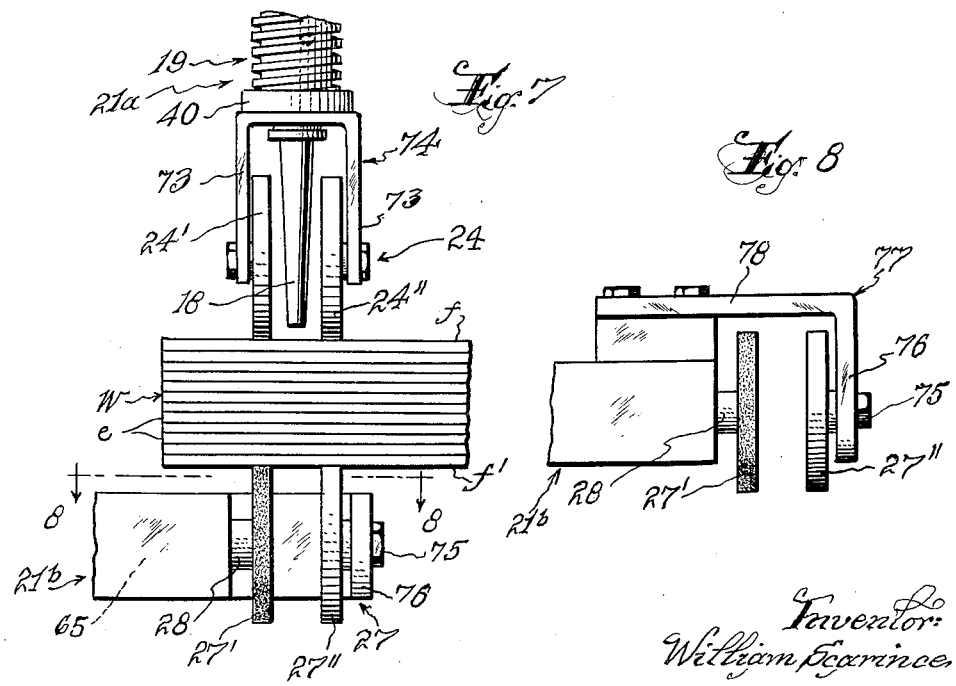
Inventor:
William Scarince,
By Dudley B. Howard,
Attorney United States Patent Office 3,071,360
Patented Jan. 1, 1963

3,071,360
STACK-CUTTING MACHINE WITH CUTTER-FOLLOWING STACK CLAMPING MEANS
William Scarince, 268 Main St., Madison, N.J.
Filed May 29, 1958, Ser. No. 738,779
11 Claims. (Cl. 266—23)

The invention relates to machines for quantity production of shaped plate metal parts by kerf-cutting through a stack of metal plates by use of cutting means such as an oxyacetylene flame, and has particular reference to the means employed to clamp the stacked plates firmly in intimate face-to-face contact with exclusion of intervening undesired air.

In stack cutting, film, unyielding air expelling clamping together of all components of a stack is essential to the production of flame-cut parts of identical marginal configuration and size. Otherwise captivated air will cause the cutting flame to deviate from the required planar cut. Prior to my present invention, it has been common practice to apply either of a few stationary clamping means to the stack as close as practicable to the line of cut. One such means is a plurality of C-clamps arranged in a row paralleling the line of cut. Another means is a pair of clamping bars paralleling the line of cut and secured together by clamping bolts. A still further means is the application of weld beads to the matching edges of the stack nearest to the line of cut, the beads being affixed while the stack is held in a press to exclude air.

Resort to any of the above-enumerated stack clamping means is laborious and time-consuming, and also causes considerable loss of metal stock. The areas covered by the usual clamping means and the welded edge portions become wasted.

It, therefore, is the primary object of my present invention to provide stack clamping means of a novel kind which does not possess the disadvantages of the prior art means for that purpose.

To be more explicit, my improved clamping means exerts clamping pressure on the stack only at points of contact in extremely close proximity to the travelling cutting means. In other words, the clamping means follows the cutter in its travel along a guided cutting path.

There are numerous advantages of the improved cutter-following clamping means. Besides requiring hardly any extra metal areas of the stack for gripping contact outside the line of cut, thin plates or sheets of less than one-eighth inch in thickness can be stack-cut without the employment of the usual waster plate heretofore placed on top of the stack to prevent the welding together of the plates or sheets along the cut edge and also to prevent buckling of the top plate or sheet and consequent loss of cutting action with possible damage to components of the stack. With the new cutter-following clamping means, plates or sheets of one-sixteenth inch thickness have been stack-cut successfully without a waster plate. Another important advantage resides in the fact that it is unnecessary to affix any clamping means to the stack before cutting commences nor to disassemble any such means at the end of the cutting operation, which represents a great saving of time and labor. My improved cutter-following clamping means is completely integrated with the cutting means, such as a travelling oxyacetylene torch.

Other advantages, features and objects of the invention will become apparent as the following specific description is read in connection with the accompanying drawings, in which:

FIG. 1 is a front elevation of the preferred embodiment of the invention, showing the same in operational engagement with an edge portion of a stack of plate components, the latter being broken away; FIG. 2 is a fragmentary vertical section of the torch holder portion of the device, a portion of the torch being shown in elevation; FIG. 3 is a horizontal section on line 3—3 of FIG. 1; FIG. 4 is a similar view on line 4—4 of FIG. 1; FIG. 5 is a fragmentary front elevation of the lower end portion of the torch holder, showing one of the presser rollers, which forms part of the upper clamping jaw, in vertical section; and FIG. 6 is an electrical wiring diagram of the motive means for the device.

FIG. 7 is a large-scale fragmentary front elevation of modified forms of upper and lower clamping jaws; and FIG. 8 is a fragmentary plan view of the lower jaw and presser means.

FIG. 9 is a small-scale front elevational view of a modified stack-cutting machine in which the upper jaw of the clamping means follows the cutter and the lower jaw is constituted by a supporting table for the stack.

Referring now in detail to the drawings, wherein like reference characters designate corresponding parts in the several views, FIGS. 1 to 6, inclusive, represent the preferred portable embodiment of the invention that is especially suitable for hand-guidance in operation.

Figure 3:
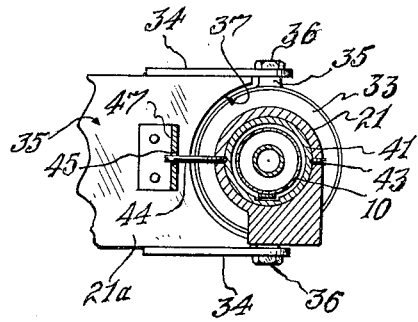

In FIG. 1, the letter W designates a stack composed of vertically stacked metallic plate components $c$ which are arranged with corresponding side edges $e$ flush in a vertical plane. The stack usually will be supported by a bench or table T constituted by parallel rails R of inverted T-shaped cross-section resting upon the machine bed B.

My improved stack-cutting machine may employ any one of several cutting means, such as the oxyacetylene torch shown in the drawings, an electric arc cutting device (not shown), or equivalent means.

The oxyacetylene torch chosen for the purpose of illustration is of conventional construction and includes a vertically disposed tubular torch body 10 having connection means 11 at its upper end for coupling thereto plural flexible tubes to supply the appropriate combustion gases. These gas tubes 12, 13 and 14, respectively, are controlled by suitable valves 15, 16 and 17. A nozzle 18 is removably secured to the lower end of torch body 10 in a position to traverse the upper face $f$ of stack W during each cutting operation.

Torch body 10 is supported in a holder 19 that is adjustably connected to a guided carriage 20. This carriage 20 is a multi-purpose device. It causes the torch body 10 to traverse stack W; it regulates the vertical distance between nozzle 18 and upper face $f$ of said stack; and it constitutes the stack clamping means of the invention. Carriage 20 includes a C-shaped frame 21 having upper and lower horizontal members 21a and 21b, respectively, which serve as unyielding opposed jaws of a stack clamp. The vertical bight portion 21c of frame 21 may be used as a handle for manual guidance of carriage 20 and the integral cutter and cutter-following clamping means incorporated therewith.

Figure 5:
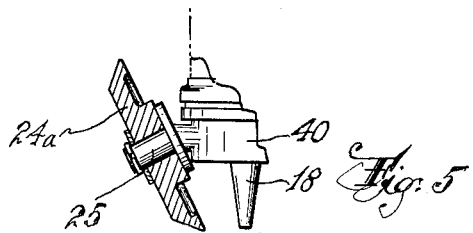

Torch holder 19 forms a vertically adjustable extension of upper jaw 21a of the stack clamp and has presser means 24 at its lower end for pressure-exerting contact with the upper face $f$ of stack W. This presser means 24 may take any one of various structural forms, but it is desirable to have low-friction rolling contact so I prefer the use of a cooperative pair of disk-like rollers 24a and 24b of comparatively large diameter which are journaled on spindles 25 and 26, respectively, provided on torch holder 19. In order to exert pressure on stack W at points located as close as possible to the line of cut, which is directly beneath nozzle 18 of torch body 10, the peripheries of rollers 24a and 24b are beveled and the axes of the respective journal spindles 25 and 26 therefor are oppositely inclined as shown in FIGS. 1 and 5 to bring the lower nip portions of the rollers into toed-in relation. Due to this arrangement, the acute edges of the roller peripheries further serve to bite into the stack and, particularly because of the oppositely inclined relation of the rollers, tend to resist any lateral slip of the machine with respect to the stack. The degree of horizontal separation of the acute nip edges of rollers 24a and 24b should be just sufficient to avoid interference with the cutting flame of the torch.

Presser means 27 for cooperation with the presser means 24 of upper jaw 21a is provided on lower jaw 21b for unyielding pressure-exerting contact with lower face f' of stack W. In this instance, there may be a single beveled roller 27a, similar to one of the rollers of presser means 24, constituting presser means 27. This roller 27a is affixed to a preferably horizontal shaft 28 which is journaled in a bearing 29 carried by the lower jaw 21b of the cutter-following clamp. Roller 27a is arranged with its acute edge in a position to bear against the underneath face f' of stack W in slightly laterally displaced relation to the line of cut so as to avoid interference with the downward path of slag issuing from the kerf being cut in the stack.

Shaft 28 of presser roller 27a is capable of rotational operation by a motive means to be described later herein in order that carriage 20 may be self-propelled when desired.

Figure 4:
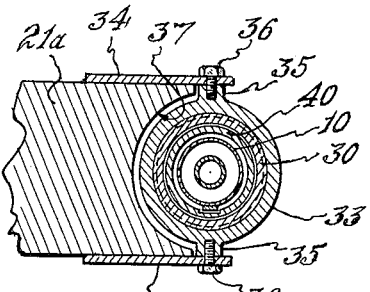

Holder 19 for torch body 10, which, as previously explained, constitutes a vertical extension of upper jaw 21a of the stack clamp partially constituted by C-shaped frame 21, includes an outer sleeve 30 that is partially screwthreaded externally at 31 for vertically adjustable engagement with the internal screw threads 32 of an annular collar 33 which is rigidly secured to upper jaw 21a by detachable means. Suitable detachable means may include, as suggested in FIGS. 1, 3 and 4, straps or tongues 34—34, which are affixed to the sides of jaw 21a and embrace diametrically opposite bosses 35—35 formed on collar 33. Tap screws 36—36 are represented as suitable means to secure the ends of straps 34—34, respectively, detachably to bosses 35—35. The circumference of collar 33 snugly fits within a recess 37 in the end of jaw 21a to ensure a rigid structure.

An external flange 38 formed on the upper end of outer sleeve 30 has diametrically arranged sockets 39—39 for application of a spanner wrench (not shown) which may be used to effect vertical unyielding precision adjustment of said sleeve and resulting pressure-regulating closing or opening of the spacing between the presser means 24—27 constituted by rollers 24a—24b and roller 27.

Holder 19 also includes a tubular guide member 40 for vertical sliding reciprocation of torch body 10 whose nozzle 18 is adapted to protrude through the open lower end of said member 40. It being intended that guide member 40 shall move vertically with outer sleeve 30 of holder 19 and at the same time be held against rotation with respect to collar 33, means for that purpose has been provided and will now be described.

The lower end portion of guide member 40 is enlarged and carries the spindles 25 and 26 for presser rollers 24a and 24b. An upwardly facing shoulder 41 underlies the lower end of outer sleeve 30 and an annular antifriction bearing unit encircles guide member 40 in interposed relation to shoulder 41 and the lower end of sleeve 30 to serve as a thrust bearing. A collar 42 surrounds torch body 10 immediately above the upper end of guide member 40 and has a downwardly facing recess in which the upper end of said member 40 fits. Suitable means, such as diametrically arranged setscrews 43 and 44 secure collar 42 to guide member 40 in such a manner that the said collar bears against the upper end of outer sleeve 30.

Setscrew 44 is horizontally elongated and has vertical sliding engagement within the longitudinal slot 45 provided in the upwardly extending arm 46 of an L-shaped bracket 47 whose horizontal foot 48 is fixedly mounted upon the upper jaw 21a of clamp frame 21. This pin-and-slot device serves to prevent rotation of guide member 40 during manual rotation of outer sleeve 30 in the act of adjusting the stack clamping pressure of presser means 24 and 27.

Figure 6:
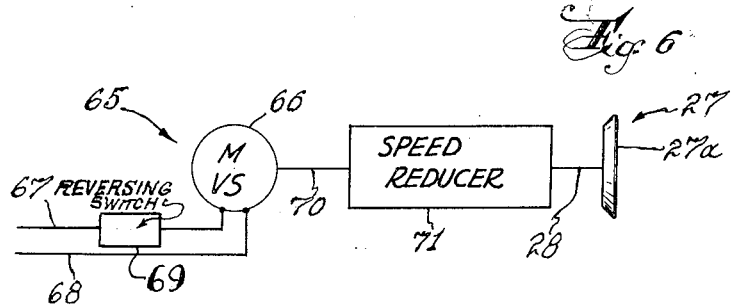

For the purpose of adjusting torch body 10 vertically in holder 19, a longitudinal rack 49 is provided on said torch body for cooperative meshing engagement by a pinion gear 50 whose shaft 51 is journaled tangentially in collar 42 and is provided with an exteriorly located manipulating wheel or knob 52. Motive means for propelling carriage 20 in a guided path in relation to the upper face f of stack W by the tractional engagement of presser roller 27a of lower clamp jaw 21b with lower face f' of said stack will now be described with reference to FIG. 6.

Lower jaw 21b of C-shaped clamp frame 21 is made hollow to house the motive means, which is designated in general by the reference numeral 65. Motive means 65, in its illustrative form, has as its prime mover a conventional variable speed electric motor 66, but it is within the scope of the invention to employ any other equivalent prime mover. Electric motor 66 is supplied with current by leads 67 and 68 which enter through the wall of the housing from an external source. Conventional reversing switch 69 is connected in the electric circuit. The shaft 70 of motor 66 is operatively connected to shaft 28 of presser roller 27a through conventional speed reducer means 71. While motor 66, terminal portions of leads 67 and 68, shaft 70, speed reducer 71, shaft 28, and parts of reversing switch 69 are shielded within the housing, manipulating means 72 for the said switch projects exteriorly through the housing wall. If desired, free-wheeling means (not shown) may be interposed between speed reducer 71 and shaft 28.

Operational use of the portable embodiment of my invention depicted in FIGS. 1 to 6 will now be described.

Stack components c, such as plates or sheets of steel, are stacked on conventional burning table T (FIG. 1) with corresponding side edges e flush in a vertical plane and sufficiently spaced from the table to leave the selected cutting area unobstructed. Carriage 20 is now supported by hand or otherwise alongside the unobstructed side edge of stack W and is moved laterally into a position wherein the jaws 21a and 21b of clamp frame 21 receive the said edge portion of said stack but without air-excluding clamping contact at first. In other words, the mouth of torch nozzle 18 and the peripheries of upper presser rollers 24a and 24b will have been set in spaced relation to the periphery of lower presser roller 27a by a distance slightly greater than the vertical thickness of stack W. Carriage 20 is then shifted horizontally into a position in which the mouth of torch nozzle 18 is directly above the point at which it is desired to start the line of cut and then lowered until the peripheries of upper presser rollers 24a and 24b come to rest upon upper face f of stack W. Thereafter, without displacing carriage 20 from starting position, outer sleeve 30 is screwed down until the periphery of lower presser roller 27a is raised into clamping contact with lower face f' of stack W. Refinements in operation of outer sleeve 30 may be required to obtain the desired degree of tight air-excluding clamping pressure on the stack components. Torch body 10 should then be adjusted in position vertically by manipulation of handwheel or knob 52 of rack-and-pinion means 49—50 until correct spacing of the mouth of torch nozzle 18 from the upper face f of stack W has been effected. The torch flame is now ignited and the cutting operation may proceed in accordance with usual methods.

The outstanding advantages of my improved cutter-following clamping means should now be apparent. There are no area-masking clamps or bars, or weld beads, to be applied to the stack beforehand or removed afterward. Clamping pressure is exerted progressively on the components of the stack in close proximity to the line of cut at all times so as to ensure that there will be no undesired layers of air pocketed between the said components to interfere with efficient flame cutting.

FIGS. 7 and 8 illustrate an alternate modification in the construction and arrangement of the presser rollers of my cutter-following clamp. In this instance, presser rollers 24' and 24" of presser means 24 of upper clamp jaw 21a differ from the corresponding parts shown in FIGS. 1 to 6 in form and manner of mounting. Each roller has a periphery that is cylindrical instead of being beveled. Moreover, both wheels are journaled on a common horizontal axis inside the parallel arms 73—73 of a fork 74 which is affixed to the enlarged lower end portion of guide member 40 of torch holder 19. By adopting the inside location of rollers 24'—24", their stack-contacting portions will be in suitable close proximity to torch nozzle 18.

The presser means 27 of lower jab 21b comprises a pair of laterally spaced coaxial rollers 27' and 27" which are arranged in the respective vertical planes of upper presser rollers 24' and 24". Presser roller 27' is rotationally affixed to shaft 28 of motive means 65 so as to be driven by the latter, but presser roller 27" may be journaled, as shown, in bearing means 75 on the inner side of horizontally extending arms 76 of L-shaped bracket 77 whose base portion 78 is bolted or otherwise secured removably to lower jaw 21b of clamp frame 21. Although it is within the scope of the invention to unite roller 27" to shaft 28 for increased driving friction, the arrangement for independent rotation shown will permit unobstructed downward discharge of slag from the cutting operation. Instead of being beveled, the peripheries of rollers 27' and 27" are cylindrical in form and the former roller may be notched or otherwise roughened to afford the desired driving traction.

FIG. 9 represents a modified embodiment of the invention as a whole. Instead of being a portable device in which the upper and lower clamping jaws are integral parts of a single carriage, as shown in FIGS. 1 to 6, the modified device has a stationary jaw and a cooperative movable jaw that includes the torch holder.

In the alternative embodiment, the table T that supports stack W on the bed B of stack-cutting machine M constitutes a stationary lower clamp jaw of the cutter-following clamp formed by machine M as a whole. The carriage means that supports the upper jaw 21' of the said clamp comprises a longitudinal carriage 79 and cross carriage 80.

Longitudinal carriage 79 is mounted by grooved top and bottom rollers 81 and 82, respectively, which ride on shafting 83 and 84 which are welded to side portions of the frame of machine M. Cross carriage 80 is an elongated member which slides on antifriction means (concealed from view) inside a housing 85 affixed to the top of longitudinal carriage 79. Upper jaw 21' of the clamping means is formed integral with the inner end of cross carriage 80 and is arranged in overlying relation to the lower jaw constituted by table T.

In the operation of the modified embodiment of my invention, the components of stack W are assembled and stacked in the usual manner on table T, which constitutes the lower clamp jaw. Then, with its upper presser rollers 24'—24" elevated slightly above the upper face f of stack W, both carriages 79 and 80 are operated in coordination to bring torch nozzle 18 into proper position to commence cutting. Outer sleeve 30 of upper jaw 21a is screwed down to clamp the stack area in close proximity to nozzle 18 down against lower jaw T with sufficient pressure to exclude air from between the components. The torch body 10 is now lowered to a proper height above face f of stack W, the torch is ignited, and cutting proceeds as in the use of the portable embodiment. Due to the close spacing of rails R of table T, stack W will be supported effectively throughout its entire horizontal area. Consequently, the only jaw that needs to follow the cutting torch is upper jaw 21a that carries the latter.

In lieu of manual guidance, the carriage means of either embodiment of my invention may be guided in a desired path of movement by automatic means. For example, the carriages may be connected by means (not shown) such as a radius rod to a center pin or to a template device.

It will be understood also that it is intended to cover all changes and modifications of the examples of the invention herein chosen for the purpose of illustration which do not constitute departures from the spirit of the invention and scope of the appended claims.

I claim:

1. A stack clamping machine for maintaining the components of a stack of flat metal plates arranged in parallel horizontal planes in intimate air excluding face-to-face contact during stack-cutting operations, said machine comprising: stack cutting means; guided carriage means to move said cutting means in a controlled path along the upper flat face of the top of the stack; and unyielding stack clamping means constructed and arranged to follow said cutting means and exert positive inward air excluding pressure on the exterior upper and lower components of the stack in close proximity to said cutting means throughout the progress thereof.

2. A stack clamping machine as defined in claim 1, to which is added precision means by which the pressure of the claming means upon the stack may be adjusted positively.

3. A stack clamping machine as defined in claim 1, wherein the stack clamping means includes upper and lower jaw means adapted to embrace the stack, the lower one of said jaw means being stationary and adapted to support the stack and the upper jaw means being movable with the carriage, and means to support the stack cutting means on the movable jaw means for movement therewith.

4. A stack clamping machine as defined in claim 3, wherein said machine includes a bed on which the guided carriage means is movably mounted; and wherein the lower jaw of the clamping means is a stack supporting table provided on said carriage mounting bed.

5. A stack clamping machine for maintaining the components of a stack of flat metal plates in intimate air excluding face-to-face contact during stack cutting operations, said machine comprising: stack cutting means; guided carriage means to move said cutting means in a controlled path along an exposed flat face of an exterior component of the stack; and unyielding stack clamping means constructed and arranged to follow said cutting means and exert positive inward pressure on the exterior upper and lower components of the stack in close proximity to said cutting means throughout the progress thereof, said stack clamping means including upper and lower jaw means adapted to embrace the stack, a vertical extension of the upper jaw means in the form of an outer sleeve having vertically adjustable screwthreaded connection to said jaw means, presser means provided on the lower end of said outer sleeve for contact with the upper face of the stack, means to rotate and thereby adjust said sleeve vertically in the upper jaw means to vary the spatial relation between both jaw means and thereby regulate the contact maintaining pressure on the stack components, the stack cutting means being in the form of a vertically elongated torch body having a burning nozzle at its lower end, a tubular cutting means holder rotatably mounted in said outer sleeve and having the cutting means vertically slidable therein, means to secure said cutting means holder against rotation during rotary adjustment of the outer sleeve, a longitudinal rack provided on the torch body, and a manipulatable pinion in meshing engagement with said rack and being journaled in the upper jaw means whereby the torch nozzle may be adjusted in relation to the stack.

6. A stack clamping machine as defined in claim 1, wherein the stack clamping means includes upper and lower jaw means to embrace the stack, stack cutting means carried by the upper jaw means for stack traversing movement therewith, presser means provided on each of said jaw means for stack contact, the upper jaw means being movable along the stack and including presser means in the form of a pair of side-by-side disk-like rollers journaled on inclined axes in a manner to bring the lower nip portions of the peripheries thereof into toed-in relation horizontally close to the cutting means the lower jaw means including presser means in the form of at least one disk-like roller arranged with its upper nip portion substantially in the vertical plane of the nip portion of one of the presser rollers of the upper jaw means.

7. A stack clamping machine as defined in claim 1, wherein the clamping means includes upper and lower jaw means adapted to embrace the stack, presser means provided on each jaw means for stack contact, at least the upper jaw means being movable along the upper surface of the stack, the presser means on the upper jaw means having positive screwthreaded connection with said upper jaw means for vertical adjustment toward and away from the lower jaw means, means by which said screwthreaded connection may be adjusted positively, the stack cutting means being supported by the upper jaw means in close proximity to the presser means thereof.

8. A stack clamping machine as defined in claim 1, wherein the stack cutting means is an oxyacetylene torch.

9. A stack clamping machine as defined in claim 7, wherein the stack cutting means is an oxyacetylene torch.

10. A stack clamping machine as defined in claim 7, wherein the presser means of at least one jaw means is a roller of disk-like construction having a sharp peripheral edge arranged for biting contact with the adjacent stack surface.

11. In combination, a vertical stack of flat metal plates to have a vertical kerf cut therethrough, each of which plate lies in a horizontal plane; and a stack clamping machine for maintaining the components of said stack of plates in intimate air excluding face-to-face contact during stack-cutting operations, said machine comprising: stack cutting means; guided carriage means supporting said stack cutting means and adapted to move the same in a controlled path along an exposed flat face of an exterior component of the stack; and unyielding precision stack clamping means constructed and arranged to follow said cutting means and to exert positive inward vertical pressure on the exterior upper and lower components of the stack in close proximity to said cutting means throughout the progress thereof.

References Cited in the file of this patent

UNITED STATES PATENTS

| 932,740 | Wiss | Aug. 11, 1909 |
|---|---|---|
| 1,172,933 | Bucknam | Feb. 22, 1916 |
| 2,001,294 | Anderson | May 14, 1935 |
| 2,148,666 | Young | Feb. 28, 1939 |
| 2,301,923 | Babcock | Nov. 17, 1942 |
| 2,441,474 | Dietrich | May 11, 1948 |

FOREIGN PATENTS

| 23,044 | Great Britain | Oct. 9, 1913 |